United States Patent [19]
Fox

[11] Patent Number: 5,514,336
[45] Date of Patent: May 7, 1996

[54] AUTOMATED EVAPORATOR FOR CHEMICAL ANALYSES

[75] Inventor: Alvin Fox, Columbia, S.C.

[73] Assignee: University of South Carolina, Columbia, S.C.

[21] Appl. No.: 28,337

[22] Filed: Mar. 9, 1993

[51] Int. Cl.⁶ .................................................. G01N 33/00
[52] U.S. Cl. ........................... 422/64; 422/63; 422/68.1; 422/99; 422/101; 422/70
[58] Field of Search ............................. 422/63, 64, 68.1, 422/70, 99, 101

[56] References Cited

U.S. PATENT DOCUMENTS

| | | | |
|---|---|---|---|
| 4,465,554 | 8/1984 | Glass | 422/101 X |
| 4,522,684 | 6/1985 | Saito | 422/99 X |
| 4,604,363 | 8/1986 | Newhouse et al. | 422/64 X |
| 4,670,219 | 6/1987 | Nelson et al. | 422/63 |
| 4,708,886 | 11/1987 | Nelson | 422/72 |
| 4,780,178 | 10/1988 | Yoshida et al. | 422/99 X |
| 4,820,044 | 4/1989 | Crighton et al. | 422/70 X |
| 5,039,614 | 8/1991 | Dekmezian et al. | 436/43 |
| 5,100,623 | 3/1992 | Friswell | 422/68.1 |
| 5,176,799 | 1/1993 | Roe et al. | 202/185.3 |

*Primary Examiner*—Jill Warden
*Assistant Examiner*—Harold Y. Pyon
*Attorney, Agent, or Firm*—Michael A. Mann

[57] ABSTRACT

An automated evaporator for use in chemical analysis that enables unattended solvent addition and evaporation. The evaporator comprises a heated water bath; a carousel adapted for holding a plurality of sample containers in the water bath; a manifold distributing a drying gas into the sample container to reduce oxidation and facilitate evaporation of the solvent; a turntable for rotating the water bath, the carousel and the manifold; and a stationary solvent reservoir adjacent to the water bath for adding solvent dropwise into each sample container as it passes under the nozzle of the reservoir. During rotation of the carousel, each sample container periodically passes under the reservoir nozzle for a predetermined amount of time to receive a predetermined amount of solvent. The solvent of each sample container is evaporated by the time the solvent is again added.

18 Claims, 2 Drawing Sheets

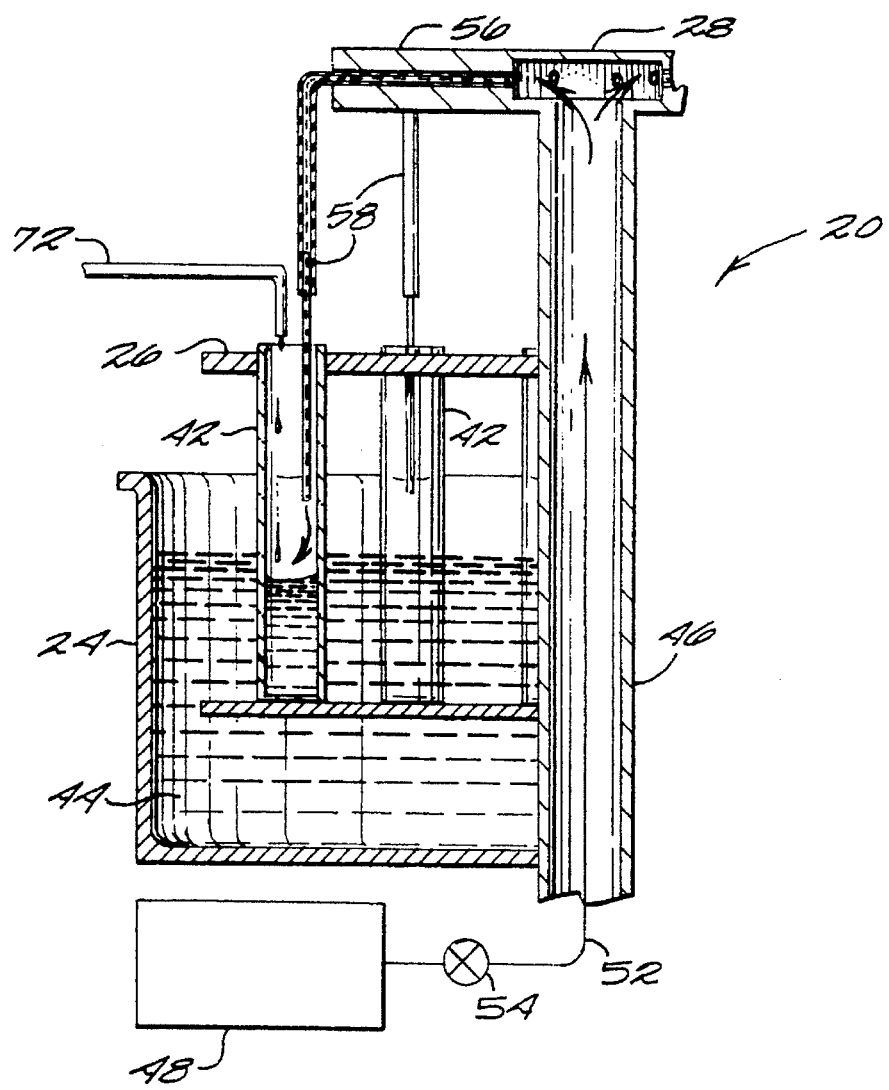

AUTOMATED EVAPORATOR FOR CHEMICAL ANALYSES

BACKGROUND OF THE INVENTION

1. Field of the Invention

The present invention relates to evaporators for use in chemical analysis. More particularly, the present invention relates to solvent evaporators and dryers used in conjunction with procedures involving sugar analysis of biological materials.

2. Discussion of Background

Many laboratory applications require evaporation of a solvent, either completely or partially, from a sample solution. In particular, sugar analysis of biological materials involving gas chromatography by itself or in conjunction with mass spectrometry includes the alditol acetate procedure. As a result of this procedure, borate are formed in the sample solution that must be evaporated before analysis of the sample can proceed.

In the ordinary alditol acetate procedure, free sugars are reduced with sodium borohydride followed by acetylation with acetic anhydride, which makes the sugars volatile. However, borate generated from the sugar reduction step complexes with hydroxyl groups of sugars thereby inhibiting the subsequent acetylation step.

The borate must be evaporated before the acetylation step. Currently, evaporation involves five cycles of adding manually 2.5 ml of methanol/acetic acid to each sample followed by evaporation under nitrogen to dryness. This manual process is extremely time consuming and requires constant attendance. Thus, an automated evaporation device for this purpose is most desirable.

Evaporators, including automated evaporators, have been known since the 1960s. None of the known evaporators are of the appropriate configuration and sufficiently practical to meet the evaporation needs of procedures such as the one described herein, that is, wherein a solvent is repeatedly added to and subsequently evaporated from a plurality of samples.

In U.S. Pat. No. 5,100,623, Friswell discloses an evaporation apparatus having a matrix of sample vessels held in a temperature-controlled water bath, each vessel being provided with nozzles for supplying gas and liquid. Pressurized air is flowed from the nozzles into the vessels to evaporate the solvent. A system of light detecting sensors and solenoid valves are used to control solvent addition to and evaporation from individual sample vessels.

Newhouse et al. (U.S. Pat. No. 4,604,363) describe an automatic, evaporator system performing evaporation and concentration, combined with solvent exchange, for a variety of different types of samples in sequence. In this system, slugs of sample solutions are delivered to a temperature- and pressure-controlled evaporation chamber. In operation, each slug is evaporated before the next is delivered. The process is repeated until the desired sample volume is attained.

Another evaporating device is described in U.S. Pat. No. 5,039,614, in which Dekmezian et al. disclose a carousel-type fraction collector for use in a method and apparatus for collecting samples for analysis of chemical composition. The collector has a plurality of plates or hollowed dishes formed of potassium bromide and placed in a vacuum oven. Effluent from a fractionator unit, such as a gel permeation chromatograph, is supplied to each plate in turn in the form of droplets. As a droplet falls onto a plate, the solvent is immediately flashed off leaving behind a solid residue. When the desired number of droplets has been deposited on the plate, a stepper motor rotates the carousel to the next collector position. After sample collection is complete, the carousel is removed from the oven and the samples are analyzed by a suitable microanalytical technique.

In an another U.S. Pat. No. (4,820,044), Crighton et al disclose a transport detector system having an elute delivery tube, a plurality of moveable spokes projecting radially from a circular hub, one or more evaporators, a detector, one or more coolers, and a stepper motor. In operation, as the hub is rotated in discrete steps, each spoke passes beneath the tube and droplets of the elute are deposited on each spoke in turn. The spokes then pass through the evaporators, the detector, and the coolers. Evaporators used in this process include hot air blowers at temperatures between 20° C. and 300° C.

Them is a need for a simple and cost-effective evaporator that is suitable for unattended, multi-cycle evaporation procedures involving multiple samples, such as the evaporation requirements of the alditol acetate procedure used in sugar analysis of biological materials.

SUMMARY OF THE INVENTION

According to its major aspects and broadly stated, the present invention is an evaporator for use in chemical analysis. In particular, it is an automated evaporator adapted for performing unattended, repeated cycles of solvent addition and evaporation. The evaporator comprises a heat source such as a water bath and heater; a carousel adapted for holding a plurality of sample containers in contact with the heat source; a manifold to distribute an inert gas, preferably nitrogen, into each sample container to reduce oxidation and facilitate evaporation of the contents of the sample containers; a turntable for rotating the water bath, the carousel and the manifold; and a stationary solvent reservoir adjacent to the water bath for adding solvent dropwise into each sample container as it passes under the nozzle of the reservoir. The rotation of the sample containers under the reservoir nozzle is controlled so that the turntable rotates each container into registration with the reservoir nozzle, the turntable paused for a preselected time, then it rotates until the next container is in registration with the reservoir nozzle. The nozzle drip rate is slower than the time required to rotate to the next container and the pause time length is coordinated with the evaporation rate so that the solvent added approximately equals the solvent evaporated. The evaporation results from the combined effect of the heat source and the drying flow of nitrogen gas.

An important feature of the present invention is the cooperation of the reservoir, the heat source, the drying gas and the turntable control to enable an appropriate amount of solvent to be added in each pass of a container under the reservoir nozzle and that amount to be evaporated in one complete rotation of the turntable. There is no gradual buildup of solvent and thus overflow of solvent from the sample containers. Therefore, the apparatus can be left unattended overnight, for example.

The turntable control is another important feature because it assures a sufficient amount of solvent is added by pausing for a sufficient amount of time when each container is under the nozzle. In a preferred embodiment, the control of the turntable is arranged so that the turntable stops when the next container is sensed rather than when the next position for a container is aligned with the nozzle. This embodiment is preferred because it does not require a full compliment of samples or the presence of "dummy" samples to occupy positions if the total number of samples is less than the total number of positions on the carousel.

Another feature of the present invention is the manifold delivery system for the gas. This system assures that substantially uniform gas pressure is applied to each container continuously notwithstanding the fact that the containers are rotating.

Still another important feature of the present invention is the combined evaporative effect of the nitrogen gas and the water bath, or other heating means. Both evaporate but the water bath provides a closely controlled, uniform source of heat to the containers and the nitrogen gas helps to remove the solvent vapors and limit oxidizing the sample by displacing oxygen from the air.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 3 is a partial side view of the evaporator showing the solvent and the drying gas being added to one of the sample containers.

DETAILED DESCRIPTION OF A PREFERRED EMBODIMENT

Figure 1:
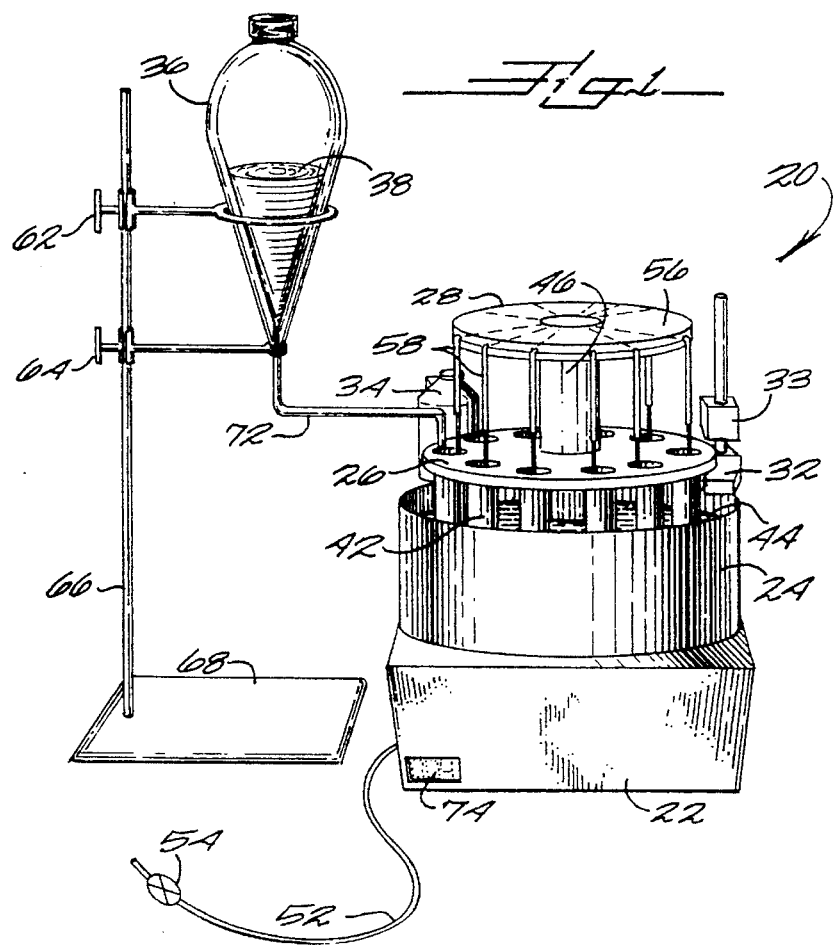
FIG. 1 is a perspective view of an evaporator according to a preferred embodiment of the present invention.

In the following description similar components are referred to by the same reference numeral in order to simplify the understanding of the sequential aspect of the drawings.

Referring now to FIG. 1, the Evaporator 20 in its preferred embodiment is a turntable 22 that rotates a housing containing a heat transfer fluid, or a fluid bath 24, a carousel 26 and a gas distributing manifold 28. Adjacent to fluid bath 24 is a sensor arm 32 and a sensor control 33. Also adjacent to fluid bath is a heating element 34. A stationary reservoir 36 carrying a solvent 38 is in spaced relation to both fluid bath 24 and carousel 26.

Carousel 26 is preferably a circular plate having a plurality of holes formed therein for holding a plurality of sample containers 42. Carousel 26 is dimensioned so that it has a circumference of sufficient size to accommodate the desired number of sample containers 42. Carousel 26 is attached to manifold 28. Carousel 26 is situated in a fluid 44 such that sample containers 42 are not completely covered by fluid 44 within fluid bath 24. Carousel 26 preferably has a flat base 45 on which sample containers 42 sit.

Fluid bath 24 is preferably a circular container or housing dimensioned slightly larger in circumference than carousel 26 for holding fluid 44. Fluid 44 may be water or some other fluid held at a temperature below the boiling temperature of solvent 38.

Alteratively, instead of using carousel 26 in conjunction with fluid bath 24, a heating block (not shown) may be used for applying heat to sample containers 42. The heating block comprises an aluminum or other conductive block with a plurality of holes drilled therein for holding sample containers 42. An electrical resistance heating element is buffed in the aluminum block so that heat from heating element 34 is conducted throughout the block when an electrical potential is applied. In this manner, the heating block provides constant, even heating to sample containers 42 positioned within the heating block.

It is important that the heat from preferably fluid bath 24 or, alteratively, from the heating block (not shown), be applied evenly to sample containers 42 and that the heat application be controlled. Preferably, sample containers 42 are brought to temperature rapidly and held at that temperature.

Manifold 28 is used for simultaneously distributing a drying, preferably non-oxidizing gas into each container of sample containers 42 (best shown in FIG. 3). Manifold 28 has a base 46 (see also FIG. 1) in fluid communication with a source 48 of drying gas (see also FIG. 2). A hose 52 or other transferring means having a control valve 54 is used for establishing gas communication between source 48 and base 46.

Manifold 28 has a circular plate 56 (see also FIG. 1) connected to base 46 and generally parallel to carousel 26. Circular plate 56 has several rubber (or other flexible material) lengths of tubing 57 radiating from the central opening of base 46 to a corresponding container among sample containers 42. Tubing lengths 57 are encased in a plastic housing. Into each outlet of each tubing length 57 a disposable glass capillary 58 is inserted. Capillaries 58 extend into sample containers 42. Thus, samples only come into contact with inert glass (capillaries 58) and are not contaminated with tubing material. A fresh set of capillaries 58 is used for each batch of samples.

Tubing lengths 57 and capillaries 58 direct drying gas from base 46 to sample containers 42 at a rate preferably great enough to drive off any oxygen from the air but not so great as to cause splashing of the sample. Preferably, drying gas is helium or nitrogen and, of those two, nitrogen is more preferable due to lower cost.

Reservoir 36 is dimensioned to hold a quantity of solvent 38 and, preferably more than enough of solvent 38 so that the evaporator 20 can be operated unattended overnight. Preferably, reservoir 36 is made of glass, TEFLON®, or a combination of the two materials so that contamination of the contents in sample containers 42, as a result of interaction between solvent 38 and materials in reservoir 36, is minimized.

Alternatively, a peristaltic pump (not shown) can be used to dispense solvent 38, but preferably one that transfers solvent 38 through materials that do not compromise the analysis of the samples contained in sample containers 42 by contaminating them. Presently available peristaltic pumps do result in some contamination but can be used when some contamination is acceptable.

Preferably, reservoir 36 is held in spaced relation to carousel 26 by a pair of clamps 62, 64 attached to a stand 66 that is supported by a base 68. Connected to and in fluid communication with reservoir 36 is a nozzle 72, which extends from reservoir 36 to carousel 26 at a location just above the radial position of sample containers 42.

Nozzle 72 operates to periodically release solvent 38 from reservoir 36. With turntable 22 incrementally rotating carousel 26, all of sample containers 42 will eventually be positioned directly under the end of nozzle 72, thus allowing solvent 38 to be dispensed therein.

Preferably, nozzle 72 releases solvent 38 in dropwise fashion. The drop rate of solvent 38 from nozzle 72 must be at least one drop per sample container and is preferably greater so that multiple drops fall into containers 42 when they are in position; but the time between drops should be longer than the time it takes turntable 22 to move the next container into position directly under the end of nozzle 72. A drop rate between these two extremes may result in an occasional drop of solvent 38 not dropping into a sample container, but over a large number of passes of each container of sample containers 42, the errant drops will not be a factor in subsequent analysis.

Alteratively, reservoir 36 can be configured to release drops of solvent 38 when and only when one of sample containers 42 is in registration with nozzle 72. However, reservoir 36 is preferably configured as a dropwise reservoir with an appropriate drip rate because of simplicity, reliability and lower cost.

Turntable 22 is preferably any type of rotating surface that can be controlled so that it stops when one of sample containers 42 is in registry with nozzle 72 and remains there for a length of time sufficient to allow the correct amount of solvent 38 to be deposited into the container before the next container is moved into registration with nozzle 72. The length of time between rotational movements of turntable 22 is directed by sensor control 33 in response to signals received from a timer 74, which is in connection with sensor control 33.

Sensor control 33 can direct the rotation of turntable 22 in one of several ways. For example, sensor control 33 can activate the turning components of turntable 22 for a period of time (or a fixed distance) sufficient for turntable 22 to turn from one sample container position on carousel 26 to the next sample container position.

Alteratively and preferably, sensor control 33 directs turntable 22 to rotate, after pausing a fixed period of time, until the next container of sample containers 42 is sensed. In this embodiment, sensor control 33 directs the rotation of turntable 22 until sensor and 32 detects the presence of a sample container, rather than the next position, at which time sensor control 33, in communication with sensor arm 32, directs turntable 22 to halt rotation for that same fixed period of time. This latter embodiment is preferred because it does not require each sample container position to be filled.

Sensor arm 32 is positioned slightly below and generally tangential to carousel 26 (see FIGS. 1–2) so that sample containers 42 briefly contact sensor arm 32 during rotation of carousel 26. Thus, sensor control 33, in electrical connection with sensor arm 32 and operational communication with turntable 22, controls movement of turntable 22 based on signals received from sensor arm 32. As a result, turntable 22 preferably rotates until sensor arm 32 senses the presence of a sample container, whereupon sensor control 33 halts rotation of turntable 22.

A further embodiment of the interaction between sensor arm 32, sensor control 33 and turntable 22 includes additional control circuitry (not shown, but could be mounted inside the housing of turntable 22) that effectively "learns" the position of each sample container during rotation of carousel 26 so that sensor arm 32 can sense "the next container" at some location other than the sample container location in registration with nozzle 72.

In use, fluid bath 24 is preferably filled with water and heating element 34, in fluid communication with fluid 44, is turned on so that heat is applied to fluid 44. Carousel 26, having the desired number and orientation of sample containers 42 positioned therein, is attached to base 46 of manifold 28 so that capillaries 58 partially extend into sample containers 42 and sample containers 42 extend partially within fluid 44.

Figure 2:
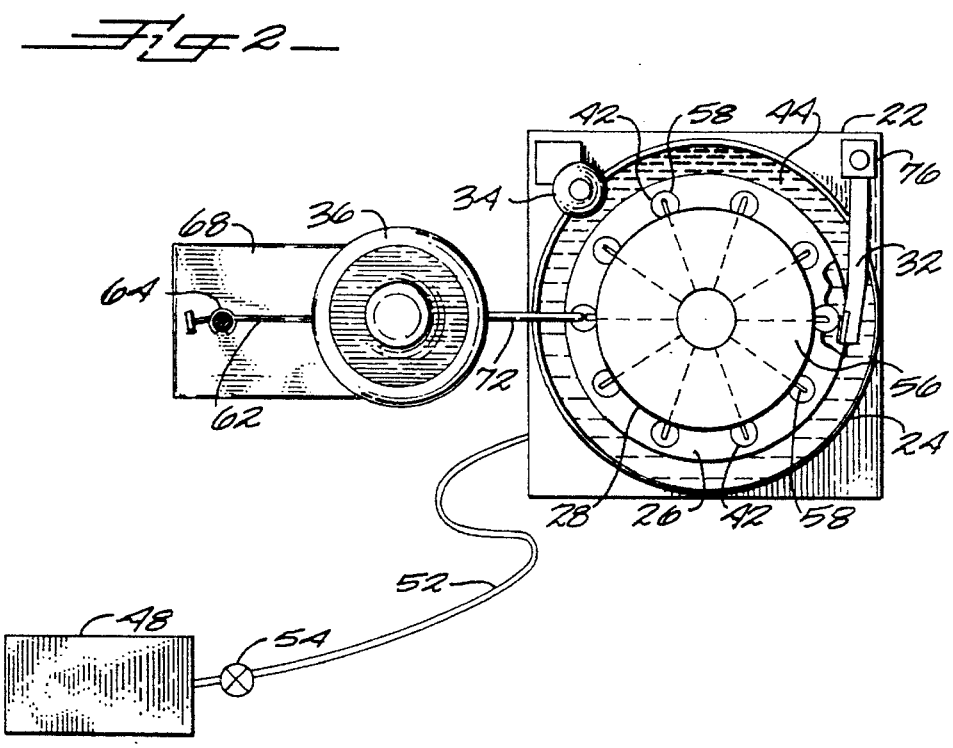
FIG. 2 is a top view of the evaporator of FIG. 1.

Reservoir 36 is positioned so that nozzle 72 is aligned just above and inside the circumference of carousel 26 where holes for sample containers 42 are formed. Also, sensor arm 32 is positioned as shown in FIGS. 1–2, that is, sensor arm 32 is generally tangential to the radial position of sample containers 42. Finally, reservoir 36 is filled with solvent 38 and manifold 28 is connected to drying gas source 48 via hose 52 and valve 54.

Depending on the particular embodiment of evaporator 20, turntable 22, as dictated by sensor control 33 in communication with sensor arm 32, is rotated so that sample containers 42 are sequentially positioned in registration with nozzle 72. During the time in which sample containers 42 are positioned in registration with nozzle 72, reservoir 36 is adding a known amount of solvent 38 to the particular sample container through nozzle 72. Similarly, during the time when sample containers 42 are not in registration with nozzle 72, the contents of such sample containers 42 are being evaporated by the combination of heat from fluid 44 in fluid bath 24 and the drying gas dispensed from capillaries 58.

For example, carousel 26 may have ten sample containers 42, as shown in FIGS. 1–2, and turntable 22 may be programmed to incrementally rotate carousel 26 36° (1/10th of 360°) every 30 seconds. For simplicity, ten sample containers 42 are shown in FIGS. 1–2. However, more commonly 21–42 sample containers would be the case. In this case, with ten sample containers 42, each sample container would be in registration with nozzle 72 for 30 seconds, during which time solvent 38 would be dispensed in dropwise fashion into the sample container at a predetermined drop rate. Then, the sample container would have 4.5 minutes (9 incrementally rotational movements every 30 seconds) before that same sample container would again be in registration with nozzle 72, during which time the contents of that sample container would be undergoing evaporation at the rate determined by the temperature of fluid 44 in fluid bath 24 and the flow rate of gas from capillaries 58.

It will be apparent to those skilled in the art that many changes and substitutions can be made to the preferred embodiment herein described without departing from the spirit and scope of the present invention as defined by the appended claims.

What is claimed is:

1. Apparatus for evaporating solvent from a plurality of sample containers, said apparatus comprising:

means for holding said plurality of containers;

means in spaced relation to said holding means for sequentially dispensing a first portion of said solvent into each container of said plurality of containers;

means for moving said holding means and said dispensing means with respect to one another so that said each container of said plurality of containers is brought into registration with said dispensing means before said dispensing means dispenses said first portion into said each container;

means in thermal communication with said holding means for heating said plurality of containers to evaporate a second portion of said solvent from said each container of said plurality of containers, said second portion being less than said first portion; and means carried by said holding means for drying a third portion of said solvent, said third portion being equal to said first portion less said second portion.

2. The apparatus as recited in claim 1, wherein said drying means further comprises means for directing a gas into said each container so that, in combination with said heating means, said first portion is evaporated completely.

3. The apparatus as recited in claim 1, wherein said drying means further comprises means for simultaneously directing a gas into said each container of said plurality of containers.

4. The apparatus as recited in claim 1, wherein said drying means further comprises means for directing a gas into said each container so that, in combination with said heating means, said first portion is evaporated before said dispensing means dispenses additional solvent in said each container.

5. The apparatus as recited in claim 1, wherein said solvent has a nominal temperature and wherein said heating means further comprises:

a housing dimensioned for holding a quantity of a fluid, said plurality of containers being in contact with said fluid; and a heater in contact with said fluid to raise the temperature of said fluid to a higher temperature relative to said nominal temperature of said solvent.

6. The apparatus as recited in claim 1, wherein said heating means further comprises:

a block in contact with said plurality of containers; and an electrical resistance heating element carried by said block, said heating element heating said block when an electrical potential is applied to said heating element.

7. The apparatus as recited in claim 1, wherein said dispensing means further comprises a reservoir carrying a quantity of said solvent, said reservoir having a nozzle for dispensing said first portion of said solvent into said each container when said each container is in registration with said nozzle.

8. Apparatus for evaporating solvent from a plurality of sample containers as part of chemical analysis, said apparatus comprising:

a carousel having a plurality of holes formed therein for receiving said plurality of containers, each hole of said plurality of holes dimensioned to receive only one container of said plurality of containers;

a reservoir in spaced relation to said carousel for carrying said solvent;

means for rotating said carousel so that said each container of said plurality of containers is brought into registration with said reservoir one at a time;

means carried by said reservoir for dispensing a first portion of said solvent from said reservoir to said each container of said plurality of containers when said each container is in registration with said dispensing means;

means in thermal communication with said carousel for simultaneously heating each container of said plurality of containers, said heating means evaporating a second portion of said solvent from each container of said plurality of containers, said second portion being not more than said first portion; and means connected to said moving means for simultaneously directing gas into said each container of said plurality of containers.

9. The apparatus as recited in claim 8, wherein said rotating means is a turntable, said turntable rotating said carousel until a next container of said plurality of containers is brought into registration with said dispensing means, pausing for a preselected time, and then resuming rotation as said each container is brought into registration with said dispensing means.

10. The apparatus as recited in claim 8, wherein said rotating means further comprises:

a turntable;

a sensor arm in spaced relation to said carousel so that said each container of said plurality of containers passes by said sensor arm as said carousel is rotated, said sensor arm sensing said each container;

control means responsive to said sensor arm and in operational connection with said turntable, said control means controlling rotation of said turntable, said sensor means causing said turntable to rotate until a next container of said plurality of containers is in registration with said dispensing means, then pausing said turntable for a preselected time, then resuming rotation of said turntable as said each container is brought into registration with said dispensing means.

11. The apparatus as recited in claim 8, wherein said apparatus is for use with a source of gas, said apparatus further comprising a manifold carried by said carousel and in fluid communication with said source of gas for distributing said gas into said each container of said plurality of containers, said gas drying a third portion of said solvent, said third portion being equal to said first portion less said second portion.

12. The apparatus as recited in claim 8, wherein said heating means further comprises:

a housing dimensioned for holding a quantity of a fluid, said plurality of containers being in contact with said fluid; and a heater in contact with said fluid to raise the temperature of said fluid to a higher temperature.

13. The apparatus as recited in claim 8, wherein said heating means further comprises:

a block in contact with said plurality of containers; and an electrical resistance heating element carried by said block, said heating element heating said block when an electrical potential is applied to said heating element.

14. The apparatus as recited in claim 8, wherein said dispensing means further comprises a peristaltic pump.

15. Apparatus for evaporating solvent from a plurality of sample containers and for use with a source of gas, said apparatus comprising:

a reservoir for holding a quantity of said solvent;

a carousel in spaced relation to said reservoir, said carousel having means formed therein for receiving said plurality of said containers;

means carried by said reservoir for dispensing a first portion of said solvent into each container of said plurality of containers;

means for evaporating a second portion of said solvent from said plurality of containers;

manifold means in fluid communication with said source of gas for directing said gas simultaneously to said each container of said plurality of containers, said gas drying a third portion of said solvent from said plurality of containers, said first portion being approximately equal to said second plus said third portion; and a turntable for rotating said carousel so that said each container of said plurality of containers is sequentially and repeatedly brought into registration with said dispensing means for dispense of said first portion of solvent, said turntable rotating said carousel, pausing as said each container of said plurality of containers is brought into registration with said reservoir and then resuming rotation.

16. The apparatus as recited in claim 15, wherein said turntable further comprises:

a sensor arm; and a sensor control responsive to said sensor arm and in operational connection with said turntable, said sensor control allowing said turntable to rotate until said sensor arm senses a next container of said plurality of containers.

17. The apparatus as recited in claim 15, wherein said turntable further comprises:

a sensor arm; and a sensor control responsive to said sensor arm and in operational connection with said turntable, said sensor control controlling rotation of said turntable and rotating said turntable until a next container is in registration with said dispensing means, then pausing said turntable for a preselected time, and then resuming rotation of said turntable as said each container is brought into registration with said dispensing means.

18. The apparatus as recited in claim 15, wherein said evaporating means operates at a temperature below the boiling temperature of said solvent.

* * * * *